United States Patent
Ackerman et al.

(10) Patent No.: US 9,305,153 B1
(45) Date of Patent: Apr. 5, 2016

(54) USER AUTHENTICATION

(75) Inventors: Karl Ackerman, Topsfield, MA (US); Lawrence N. Friedman, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/538,913

(22) Filed: Jun. 29, 2012

(51) Int. Cl.
   *G06F 21/32* (2013.01)
   *G06F 21/34* (2013.01)

(52) U.S. Cl.
   CPC .............. *G06F 21/32* (2013.01); *G06F 21/34* (2013.01)

(58) Field of Classification Search
   CPC ..... G06F 11/3089; G06F 21/32; G06F 21/33; G06F 21/34; G06F 21/35
   USPC .......................................................... 726/7
   See application file for complete search history.

(56) References Cited

U.S. PATENT DOCUMENTS

| | | | |
|---|---|---|---|
| 2001/0044900 A1* | 11/2001 | Uchida .................. | 713/186 |
| 2002/0095588 A1* | 7/2002 | Shigematsu et al. .......... | 713/186 |
| 2002/0152034 A1* | 10/2002 | Kondo et al. ................ | 702/19 |
| 2002/0171546 A1* | 11/2002 | Evans et al. .................... | 340/540 |
| 2003/0103414 A1* | 6/2003 | Lyon .................. | 368/10 |
| 2003/0129964 A1* | 7/2003 | Kohinata et al. .............. | 455/411 |
| 2004/0243856 A1* | 12/2004 | Shatford .............. | 713/202 |
| 2005/0035200 A1* | 2/2005 | Hendrick .............. | 235/441 |
| 2005/0182927 A1* | 8/2005 | Shatford .............. | 713/159 |
| 2005/0211784 A1* | 9/2005 | Justin .............. | 235/492 |
| 2006/0041759 A1* | 2/2006 | Kaliski et al. ................. | 713/184 |
| 2006/0219776 A1* | 10/2006 | Finn .............................. | 235/380 |
| 2007/0130676 A1* | 6/2007 | Von Blucher .............. | 2/456 |
| 2007/0186116 A1* | 8/2007 | Clemmensen et al. ....... | 713/186 |
| 2007/0192599 A1* | 8/2007 | Kato ..................... H04L 9/0844 713/168 |
| 2008/0211623 A1* | 9/2008 | Scheurich .............. | 340/5.2 |
| 2009/0133106 A1* | 5/2009 | Bentley et al. ................ | 726/5 |
| 2009/0203355 A1* | 8/2009 | Clark ............................ | 455/411 |
| 2010/0049659 A1* | 2/2010 | Cassone .............. | 705/64 |
| 2010/0050793 A1* | 3/2010 | Ahn .............................. | 73/866 |
| 2010/0088754 A1* | 4/2010 | Ghislanzoni .................. | 726/9 |
| 2011/0199192 A1* | 8/2011 | Buckner .................... | 340/10.51 |
| 2013/0104187 A1* | 4/2013 | Weidner ................ G06F 21/31 726/1 |

FOREIGN PATENT DOCUMENTS

WO      WO 9965175 A1 *  12/1999  .............. H04K 1/00

OTHER PUBLICATIONS

Huang et al., A User Authentication Scheme Based on Fingerprint and USIM Card, Aug. 2008, International Conference on Intelligent Information Hiding and Multimedia Signal Processing, pp. 1261-1264.*

* cited by examiner

*Primary Examiner* — Kenneth Chang

(74) *Attorney, Agent, or Firm* — Krishnendu Gupta; Jason A. Reyes

(57) ABSTRACT

There is disclosed a user authentication device for generating time-varying authentication information for authenticating a user in an authentication system. The device comprising at least one sensor for sensing at least one of a biometric measurement of the user and a characteristic of the environmental surroundings of the device.
There is also disclosed an authentication system and a method for authenticating a user in an authentication system.

1 Claim, 3 Drawing Sheets

USER AUTHENTICATION

TECHNICAL FIELD

The invention relates generally to user authentication. Specifically, the invention relates to a user authentication device, an authentication system and a method for authenticating a user in an authentication system.

BACKGROUND OF THE INVENTION

Generally, security systems employ an identity-based authentication scheme to verify the identity of a user before granting access to an access-controlled resource. One goal of such security systems is to accurately determine identity so that an unauthorized party cannot gain access. Security systems can use one or more of several factors, alone or in combination, to authenticate users. For example, identification systems can be based on something that the user knows, something the user is, or something that the user has.

Examples of something a user knows are a code word, password, personal identification number ("PIN") and the like. One exemplary computer-based authentication method involves the communication of a secret that is specific to a particular user. The user seeking authentication transmits the secret or a value derived from the secret to a verifier, which authenticates the identity of the user. In a typical implementation, a user communicates both identifying information (e.g., a user name) and a secret (e.g., a password) to the verifier. The verifier typically possesses records that associate a secret with each user. If the verifier receives the appropriate secret for the user, the user is successfully authenticated. If the verifier does not receive the correct secret, the authentication fails.

Examples of something the user is include a distinct characteristic or attribute known as a biometric. It will be known by those skilled in the art that a biometric is a unique physical or behavioral characteristic or attribute that can be used to identify a person uniquely. Biometrics encompass a variety of techniques designed to accurately identify a person including fingerprinting, facial recognition, eye retina patterns, DNA sequences, voice and body movement recognition, handwriting and signature recognition. It will appreciated that some physical or behavioral characteristics or attributes are typically not under the control of the person, and are therefore difficult for anyone besides the intended person to present, because, in part, they are difficult to replicate. The verifier typically can observe these physical or behavioral characteristics or attributes and compare these to records that associate the characteristics or attributes with the user. The observation of these characteristics or attributes is referred to generally as biometric measurement.

An example of something a user possesses is a physical or digital object, referred to generally as a token, that is unique, or relatively unique, to the user. It will be appreciated that possession of a token such as a bank card having certain specific physical and electronic characteristics, for example containing a specific identification number that is revealed when the token is accessed in a particular manner, can be this type of factor. A token containing a computing device that performs encryption using an encryption key contained in the device would also be regarded as this type of factor. For example, a token could accept user input, which might include a PIN or a challenge value, and provide as output a result encrypted with a secret encryption key stored in the card. The verifier can then compare the output to an expected value in order to authenticate the user.

A token can also use input information, such as time, or a counter, for example, such that the result changes over time. These systems generally perform some computation using a stored secret as input to generate an authentication code that is used to authenticate the user. Some systems are time-based in that they use a time-based dynamic variable to calculate a non-predictable authentication code that ultimately authenticates the user. It will be appreciated that "non-predictable" used in this context means that the authentication code is not predictable by a party that does not know the associated secret, the algorithm for calculating the code, or both.

Although the dynamic nature of the authentication codes generated by such an approach avoids problems inherent with using fixed authentication codes, an unattended or stolen token remain vulnerable to attack. Would-be attackers who gain access to tokens can subject the tokens to sophisticated analysis intended to determine their methods of operation and/or the secret(s) stored within. Attackers might inspect the token and conduct such analysis in order to determine the associated secret, the algorithm for calculating the authentication code, or both. The attacker might then be able to generate apparently valid authentication codes in order to illegally gain physical or electronic access to secured areas or systems. Many tamper-resistant hardware designs are available, however, new attacks are frequently developed to thwart tamper resistance.

Therefore, there is a need for stronger authentication in view of these types of security threats.

SUMMARY OF THE INVENTION

There is disclosed a user authentication device for generating time-varying authentication information for authenticating a user in an authentication system. The device comprising at least one sensor for sensing at least one of a biometric measurement of the user and a characteristic of the environmental surroundings of the device.

There is also disclosed an authentication system and a method for authenticating a user in an authentication system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
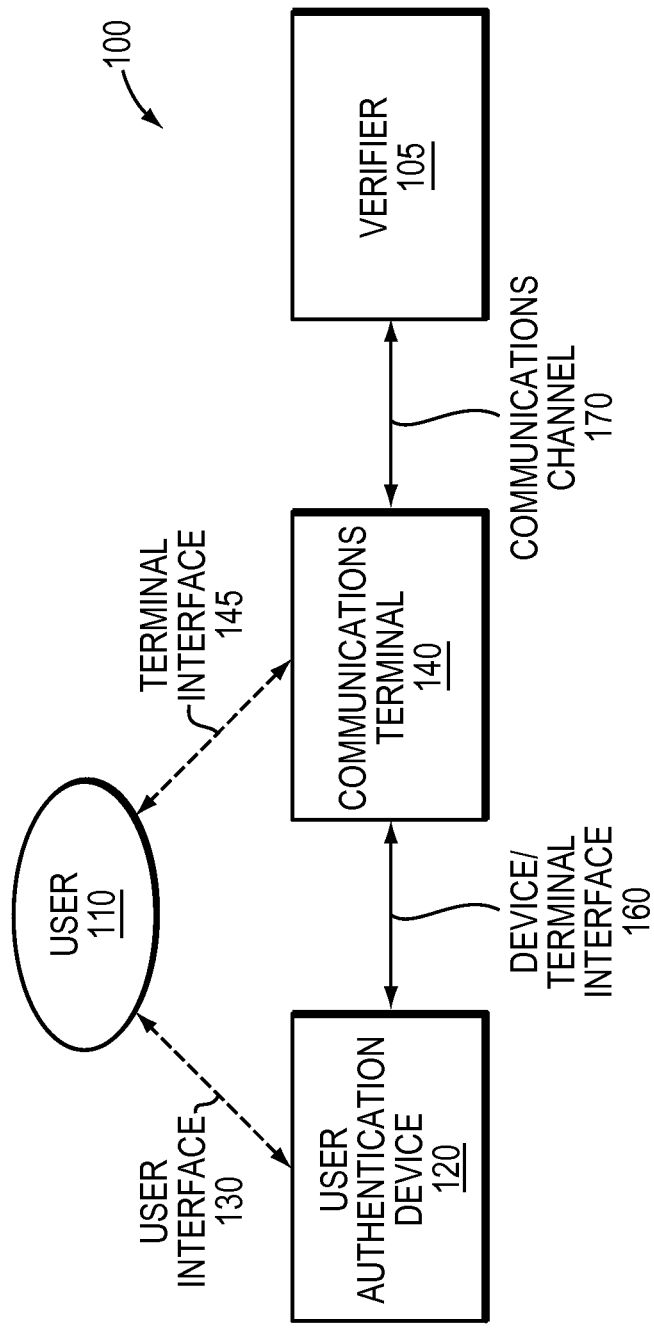
FIG. 1 is a block diagram of an example embodiment of an authentication system comprising a verifier and a user authentication device.

Referring to FIG. 1, there is illustrated an example embodiment of an authentication system 100 comprising a verifier 105 for securely authenticating the identity of an exemplary user 110. As used herein, "authenticate" means to verify the identity of a user, and so "authenticate" and "verify" can be used interchangeably throughout. Also, although the specification will discuss, for simplicity, authentication of "users," it should be understood that "users" means any entity requiring authentication such as, for example, a person, animal, device, machine, or computer. The inclusion of a single user 110 is exemplary, and typically a verifier 105 will be used to verify a large number of users 110. Similarly, the inclusion of a single verifier 105 is exemplary, and typically a user 110 can have an authentication attempt verified by one or more of a large number of verifiers 105. In some embodiments, a single verifier 105 is able to verify a user 110, while in other embodiments, two or more verifiers 105 are together required to perform this task.

The verifier 105 can be any sort of device that implements the functions described herein. In one embodiment, the verifier 105 is implemented as software running on a server class computer including a processor, memory, and so on, to enable authentication of a large number of users, for example, in an enterprise. The verifier 105 can also be implemented as software running on a desktop computer, laptop computer, special-purpose device, a smart-phone or personal digital assistant (PDA). For example, the verifier 105 can be implemented as a software program running on a general-purpose computer, possibly interacting with one or more other computer programs on the same or a different computer. Some or all of the verifier 105 functionality can be implemented in hardware, for example in an Application Specific Integrated Circuit (ASIC) and the like. In still further embodiments, the verifier 105 can be implemented in a cellular telephone, or specialized hardware embedded in a cellular telephone and adapted to interact with the cellular telephone's circuitry. It will be appreciated by those skilled in the art that other sizes, shapes, and implementations are also possible.

Authentication can result in the performance of one or more actions including, without limitation, providing access or privileges, taking action, or enabling some combination of the two. Access includes, without limitation: access to a physical location, communications network, computer system, and so on; access to such services as financial services and records, health services and records and so on; or access to levels of information or services. The user 110 and the verifier 105 can be physically near one another or far apart.

As illustrated, a user 110 can communicate with a user authentication device 120. The user authentication device 120 provides information used to authenticate the user 110. The user authentication device 120 can provide a user interface 130. Communication between the user 110 and the user authentication device 120 can take place via this user interface 130. The user interface 130 can provide an input interface and an output interface.

An input interface enables the user 110 to communicate information to the user authentication device 120. The input interface can be any mechanism for receiving user input, and can include, without limitation: a keypad or keyboard; one or more push buttons, switches or knobs; a touch sensitive screen; a pointing or pressing device; a trackball; a device for capturing sound or voice or handwriting; a device for capturing biometric input; and so forth. It will be understood that in this embodiment the input interface comprises at least one sensor associated with the device 120 for sensing at least one of a biometric measurement of the user 110 and a characteristic of the environmental surroundings of the device 110. For example, the at least one sensor can be partially embedded in the device 120. It will be appreciated that in an exemplary embodiment a plurality of sensors are at least partially embedded in the device. It will also be appreciated that in an exemplary embodiment the sensors are embedded such that a portion of the sensors are exposed on the surface of the device. This exposure enables the sensors to sense biometric measurements of the user in response to the user 110 touching the device. For example, the biometric measurements can include, but are not limited to, a temperature, a heartbeat, perspiration, chemical signals, movement patterns, the pressure with which the device is being held, and the like. The sensors also enable characteristics of the environmental surroundings of the device 120 to be sensed. For example, the environmental characteristics can include, but are not limited to, a temperature, a pollutant in the environment, electromagnetic/RF signals, light, chemicals in the environment, sounds, barometric pressure, and the like.

An output interface enables the user authentication device 120 to communicate information to the user 110 and can be any mechanism for communicating to a user, including, without limitation: a visual display to support alphanumeric characters or graphics such as a LCD display or LED display; an electrophoretic display; one or more light sources; a loudspeaker, a sound or voice generator; a vibration interface; and so forth.

The user authentication device 120 can take various forms in various embodiments provided that the user authentication device 120 performs the functions required of the user authentication device 120 for secure authentication. The user authentication device 120 can be implemented in packages having a wide variety of shapes and form factors. For example, the user authentication device 120 can be a credit-card sized and shaped device, or can be much smaller or much larger. One credit-card sized embodiment of the user authentication device 120 includes a microprocessor with on-board memory, a power source, and a small LCD display. The embodiment optionally includes a keypad or buttons for PIN entry, entry of authentication information requests, or for other entry or interaction with the device 120. In other examples, the user authentication device 120 is a "key fob," that is, a smaller device with a display and battery that is sized and shaped to fit on a key ring. Other sizes, shapes, and implementations are also possible.

Exemplary authentication devices in accordance with the embodiments herein are members of the RSA SECURID family of authentication tokens, available from RSA, The Security Division of EMC, of Bedford, Mass. Some RSA SECURID hardware devices, for example, display generated authentication information to a user, who then communicates the displayed authentication information to a computer for communication to a verifier. For example, in one embodiment, the information is a numerical value.

However, it will be appreciated that the term 'authentication information' used herein is intended to be construed broadly so as to encompass any type of authentication data that may be required in order to obtain access to an access-controlled resource. Thus, the term is intended to encompass, for example, alphabetic or numeric or alphanumeric passcodes, images, sets of words, sentences, phrases, questions/answers, or any other type of authentication data.

In some embodiments, the user authentication device 120 stores a secret that is used to authenticate the user 110. Typically, the stored secret is information that only is available to the authentication device and the verifier. For example, in one embodiment, the information is a numerical value. The stored secret is used to generate an authentication code for the user 110. The user authentication device 120 also can store or access dynamic data, which, for example, can be the current time, if implemented with a running clock. The user authentication device 120 can also provide other information, or perform other calculations or combination functions, as described further below. For example, in one embodiment, in addition to storing a secret the device 120 receives a personally selected secret from the user 110 (such as a PIN or password) and generates a dynamic non-predictable authentication code in response to the secret received from the user 110, the stored secret, and the current time. Here, for example, a non-predictable authentication code is not predictable to anyone who does not have access to the secret received from the user 110, the stored secret, and the algorithm that generates the authentication code. The user authentication device 120 optionally can also receive other input, such as a verifier identification, and use that and/or other additional information in the generation of the authentication code.

The exemplary user 110 can have both direct access to a communications terminal 140 and indirect access to the communications terminal 140 via the user authentication device 120. The communications terminal 140 can take various forms in various embodiments, including without limitation: a card reader; a device receptacle, cradle, or holder; a personal computer; a telephone; a personal digital assistant (PDA); a network interface card; a wireless transceiver; and so on. For example, during the authentication process the user 110 can directly communicate information to the device 120, the terminal 140 or both the device 120 and the terminal 140. Likewise, the communications terminal 140 can receive direct input from the user 110, the user authentication device 120 or both. As shown, the user 110 can communicate directly with the communications terminal via terminal user interface 145 that can be present depending on the implementation of the communications terminal 140. Like the device user interface 130, the terminal user interface 145 can include an input interface, an output interface, or both. The input and the output interfaces can take one or more of the forms described above for the device user interface 130, or other forms.

The communications terminal 140 can also provide a device/terminal interface 160 for communications between the terminal 140 and the user authentication device 120. In one embodiment, this interface can take the form of a wired or wireless communications channel between the terminal 140 and the device 120, using standard or proprietary protocols. For example, in an embodiment in which the device 120 is a token that has wireless communications capability and the terminal 140 includes a wireless transceiver, the interface 160 could be a wireless link.

The terminal 140 and the authentication device 120 can each be integrated, together or separately, into another device, likewise, the functionality of the terminal 140, the device 120 and their respective interfaces 130, 145, 160 can be implemented in separable components. For example, the authentication device 120 can be implemented as an add-in card to a handheld computer (not shown). The handheld computer provides the user interface 130 and also provides the terminal 140 in the form of a wireless network interface.

The communications terminal 140 communicates information to the verifier 105 via a communications channel 170. The communications channel 170 can be any method and/or interface that enables communication of information to the verifier 105 that is required to authenticate the identity of the user 110. The communications terminal 140 can communicate information generated by the user 110, the device 120, or both, to the verifier 105 over a communications channel 170. The communications terminal 140 and the verifier 105 can implement the communication channel 170 through a variety of connections including standard telephone lines, LAN or WAN links (e.g., 802.11, T1, T3, 56 kb, X.25), broadband connections (ISDN, Frame Relay, ATM), and wireless connections. Connections between the communications terminal 140 and verifier 105 can be established using a variety of communication protocols (e.g., TCP/IP, IPX, SPX, NetBIOS, Ethernet, RS232, and direct asynchronous connections). The verifier 105 processes the information received from the communications terminal 140. The verifier 105 can perform actions in response to authenticating the identity of the user 110. For example, the verifier 105 can grant on-line access to data or physical access to restricted areas or physical items.

The authentication information communicated over the communications channel 170 is designed to be dynamic and unpredictable (to an observer without knowledge of the algorithm and/or the secret used to generate the authentication code and/or access to previous user authentication attempts) for each user authentication attempt. In some embodiments, the algorithm is selected such that the authentication code is non-predictable even if the algorithm is known to the attacker. Also, the algorithm may be selected such that knowledge of a large set of previous authentication attempts for a multiplicity of users would not make an authentication code predictable to an attacker.

In some embodiments, in order to authenticate the user, the verifier 105 performs algorithmic calculations for each user authentication attempt that is substantially identical to the algorithmic calculation performed by the user authentication device 120. The verifier 105 compares the authentication information received over communications channel 170 from the user 110 and the authentication information generated by the verifier 105 to determine whether any match.

It will also be appreciated that in addition to the comparison of the authentication information the verifier may in order to strengthen authentication also perform an analysis between at least one of a sensed biometric measurement and a sensed characteristic of the environmental surroundings of the device 120 and at least one of a recorded user biometric profile and a recorded environmental profile. It will be understood from the above disclosure that the input interface 130 of the device 120 comprises at least one sensor at least partially embedded in the device 120 for sensing at least one of a biometric measurement of the user 110 and a characteristic of the environmental surroundings of the device 110. It will be further understood that the biometric measurement and the environmental characteristic may be analyzed against a biometric profile and a environmental profile, respectively. The profiles may be recorded in the verifier before activating the device 120 for authentication.

It will be further appreciated that in some embodiments the device may be configured to store the biometric and environment profiles. The device may also sense at least one of the biometric measurements and environmental characteristic using the sensors such that the analysis between at least one of a sensed biometric measurement and a sensed characteristic of the environmental surroundings of the device 120 and at least one of a recorded user biometric profile and a recorded environmental profile may be performed in the device 120 rather than the verifier 105. If the analysis is successful the device can display valid authentication information. If the analysis is unsuccessful the device 120 may refuse to display the authentication information or display authentication information that is modified. It will be appreciated that if the device 120 displays modified information, the verifier 105 will deny authentication in response to the user forwarding the information to the verifier 105 as the modified information is invalid.

It will be still further appreciated that the sensors as described above can sense multiple biometric measurements and environmental characteristics and that these multiple measurements and characteristics may be analyzed with respect to their respective profiles. This more detailed analysis will further strengthen authentication.

It will be still further appreciated from the above disclosure that in some embodiments at least it is necessary for there to be a match between the authentication information, and for the analysis to be successful, in order for the verifier 105 to authenticate the identity of the user 110. If there is no match, or if the analysis is unsuccessful, the user authentication attempt fails. In some embodiments, the verifier 105 can communicate positive or negative acknowledgement to the communications terminal 140 via the communications channel 170, and the terminal 140 may or may not communicate the acknowledgement to the device 120 or directly to the user 110.

Figure 2:
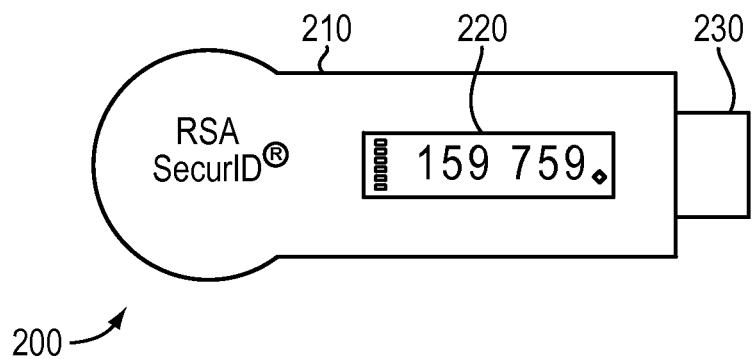
FIG. 2 is an example of a user authentication device.

Referring to FIG. 2, there is illustrated an example embodiment of a user authentication device 200 for generating time-varying authentication information for facilitating authentication of a user in an authentication system. It will be understood that in exemplary embodiments the device is a RSA authentication token for generating time-varying authentication information for authenticating a user in an authentication system substantially similar to the system 100 as described with respect to FIG. 1. The device 200 comprises a main body 210 having a user output interface in the form of a display 220 for presenting authentication information to the user. For example, the authentication information can be an alphanumeric passcode which is changeable periodically such that the passcode is only valid for a predetermined period of time. It will be understood from the above description that the passcode is a unique code known only to the authentication device and the verifier for facilitating authenticating of a user in the authentication system such that the user can access an access-controlled resource.

The device 200 also comprises at least one sensor (not shown) for sensing at least one of a biometric measurement of the user and a characteristic of the environmental surroundings of the device. It will be appreciated that in this embodiment the at least one sensor is at least partially embedded in the body 210 of the device for sensing at least one of a biometric measurement of the user and a characteristic of the environmental surroundings of the device. It will be understood that in this embodiment a plurality of sensors are at least partially embedded in the body 210 for sensing the at least one of the biometric measurement of the user and the characteristic of the environmental surroundings of the device 200. Because of their relatively small size and power consumption, a plurality of nano-sensors are ideal for embedding in the body 210. The nano-sensors are embedded in the body 210 such that a portion of the sensors are exposed on the surface of the body. Such an arrangement of the sensors enables the sensors to detect a biological characteristic of the user in response to the user touching the surface of the body. Furthermore, the sensors can detect a characteristic of the environmental surroundings of the device 200. For example, the characteristic can be a pollutant in the environment, a temperature, electromagnetic radiation, light, barometric pressure, vibrations and the like. It will be appreciated that environment characteristics can be different in certain locations. For example, the temperature in Florida is rather different to the temperature in Alaska. In another example, the pollution in a region may be unusually high compared to a national average. By combining biometric/environmental inputs the accuracy of user authentication can be improved. This will be described in further detail below.

The device 200 also comprises one or both of a transmitter (not shown) for communicating over user input interface 145 with the terminal 140 or a plug member 230 such as a USB plug member for facilitating communication between the terminal 140 and the user authentication device 200. The transmitter and/or the plug member 230 facilitate the transmission of the sensed biometric measurement or the sensed environmental characteristic or both to the terminal 140.

Figure 3:
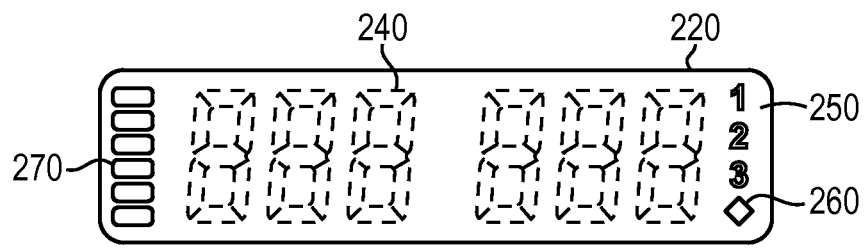
FIG. 3 is an example of a display of the user authentication device of FIG. 2.

Referring to FIG. 3, there is illustrated the display 220 in a non-energized non-operational state comprising six numerals 240 that represent the authentication information. The device displays the numerals 240 centrally to allow a user to read clearly therefrom. The display 220 also comprises three peripheral numerals 250 and a diamond character 260 located on the right side periphery thereof. The device in an energized operational state displays the diamond character blinking at a predetermined rate to signify that the device is functioning properly. Additionally, the device displays the peripheral numeral three in response to determining the battery life of the device is to expire shortly. For example, the numeral may be visible in response to determining that the battery life is to expire in a month. Additionally, the display comprises countdown bars 270 on the left side periphery thereof. The countdown bars 270 may illustrate the time remaining before new authentication information is issued and displayed on the display. For example, new authentication information may be issued and displayed every sixty seconds and one countdown bar may disappear every ten seconds to illustrate the time remaining before new authentication information is displayed. Moreover, the device is configured so that the authentication numerals, countdown bars, peripheral numerals and diamond character blink simultaneously in response to detecting an error in connection with the device.

Figure 4:
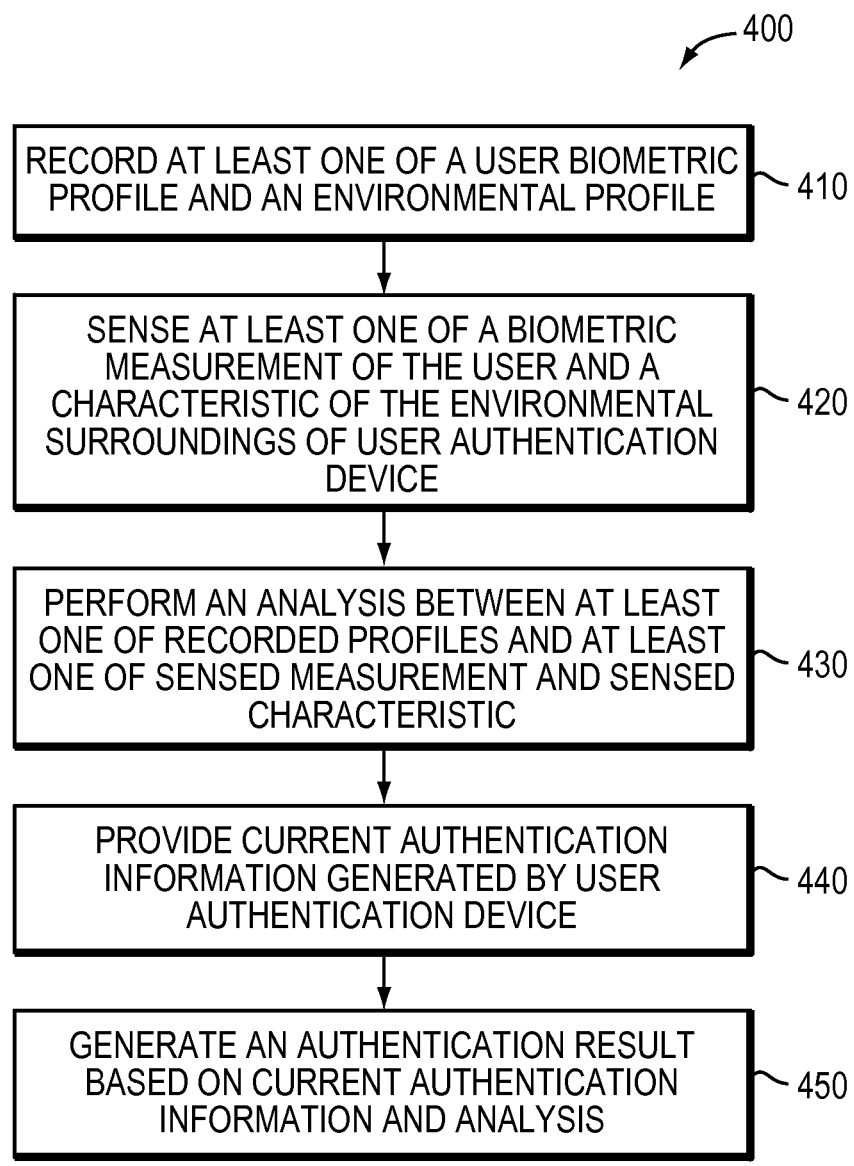
FIG. 4 is a flowchart summarizing the steps of a method for authenticating a user in an authentication system.

Referring to FIG. 4, there is illustrated a method for authenticating a user in an authentication system 100. The system 100 comprises a verifier 105 and a user authentication device (120, 200) for generating time-varying authentication information for authenticating a user in the authentication system 100. The user authentication device (120, 200) comprising at least one sensor for sensing at least one of a biometric measurement of the user and a characteristic of the environmental surroundings of the device. It will be appreciated that in this particular embodiment the device comprises a plurality of nano-sensors at least partially embedded in the device for sensing biometric measurements and environmental characteristics. Additionally, it will be appreciated that in this embodiment the user authentication device (120, 200) is a portable authentication token. For example, the token may be a RSA SECURID token. It will be still further appreciated that in this embodiment the verifier 105 is implemented as software running on a server class computer including a processor and memory for enabling authentication of a large number of users, for example, in an enterprise.

The method comprises recording 410 at least one of a user biometric profile and an environmental profile. It will be understood that in this embodiment the profile(s) are recorded in the verifier 105 for facilitating authentication of the user. For example, the profile(s) may be recorded as part of an enrollment process before the authentication device (120,

200) is activated for use. It will be appreciated that the biometric profile of the user can be any biometric measurement(s) associated with the user. The environmental profile can be a characteristic of the environment from which the user typically requests authentication. For example, if the user frequently requests authentication from home it will be accepted that an environmental profile of the home location will be recorded. It will be understood that if the characteristic relates to the temperature in the area it may be that a profile of the yearly temperatures will be recorded as the temperature may fluctuate throughout the year. This may require the user submitting a profile.

The method comprises sensing 420 at least one of a biometric measurement of the user and a characteristic of the environmental surroundings of the device. It will be understood from the above disclosure that in this embodiment at least one sensor is at least partially embedded in the device for sensing at least one biometric measurement(s) of the user and characteristic(s) of the environmental surroundings of the device 200. The sensors may be nano-sensors embedded in the body of the device such that a portion of the sensors are exposed on the surface of the body for sensing biometric measurement(s) and environmental characteristic(s). By having the sensors exposed, the device can sense the biometric simply by the user touching the device. It will be appreciated from the above that in exemplary embodiments the sensors sense both the biometric measurement(s) and environmental characteristic(s) for increasing security in the authentication system.

It will be appreciated that in this exemplary embodiment the user authentication device (120, 200) can communication with the verifier 140 for transmitting the at least one of the sensed biometric measurement and the characteristic of the environmental surroundings to the verifier 105. It will be understood that communicating includes direct communication between the user authentication device and the verifier and indirect communication through an intermediary. In this embodiment, the device (120, 200) communicates with the terminal 140 using a transmitter over user input interface 145 or by the plug member 230 for communicating the measurement or the characteristic or both to the terminal. The terminal 140 communicates the measurement or the characteristic or both to the verifier 105 via a communications channel 170 such that they can be analyzed with the recorded profile(s) in the verifier 105 for facilitating authentication of the user.

The method comprises performing 430 an analysis between the at least one of the recorded user biometric profile and the environmental profile and the at least one of the sensed biometric measurement and the characteristic of the environmental surroundings. For example, a processor in the verifier 105 can perform the analysis in order to assess the similarity between at least one of the recorded profiles and the at least one of the sensed biometric measurement and the characteristic of the environmental surroundings. It will be appreciated that the analysis will analyze the biometric profile with respect to the biometric measurement and/or the environmental profile with respect to the environmental characteristic.

The method comprises providing 440 the current authentication information generated by the user authentication device 120. For example, as shown in FIG. 1, the user 110 can communicate directly with the communications terminal via terminal user interface 145 for providing the current authentication information as generated by the device 120 to the terminal. Additionally, the user authentication device 120 and the terminal 140 communicate through the device/terminal interface 160 for providing the authentication information to the terminal 140. In both embodiments, the terminal 140 provides the current authentication information to the verifier 105 via the communications channel 170.

The method comprises generating 450 in the verifier an authentication result based on the current authentication information generated by the user authentication device 120 and the analysis. For example, the authentication result can be an identity score which indicates the likelihood of the user being an authentic user. It will be appreciated that the user can be authenticated in response to the analysis as performed by the verifier being within a predetermined threshold of certainty and the authentication information provided to the verifier being valid. Alternatively, the user can be denied authentication in response to the authentication result as determined by the verifier being outside the predetermined threshold of certainty and/or the authentication information provided to the verifier not being valid.

While the above description describes the authentication information and the sensed biometric measurement(s) and/or sensed environmental characteristic(s) being provided to the verifier separately, it will be understood that in some embodiments the authentication information and the sensed biometric measurement(s) and/or sensed environmental characteristic(s) will be provided together simultaneously.

While the above description describes the profiles being recorded in the verifier and the analysis being performed in the verifier, it will be appreciated that in some embodiments the profiles may also be recorded in the device itself such that the analysis can take place in the device. Needless to say, in such an embodiment, there will be no need to transmit the sensed information to the verifier. It will be sufficient to only provide the current authentication information.

While the above description describes the sensed information and the profiles being analyzed, it will be understood that in some embodiments both the device 120 and terminal 140 can sense a similar environmental characteristic such that a second analysis can be performed between the environmental characteristics as sensed by the device 120 and terminal 140 to establish if the characteristics are similar. It will also be understood that the authentication result can be based on both the first and second analysis and the current authentication information. This additional analysis can be useful in assuring that the user 110, the device 120 and the terminal 140 are all located in a similar location.

While it is described above that the environmental characteristic and the environmental profile are analyzed, it will be understood that the verifier 105 could also accept an environmental characteristic such as temperature information from the terminal 140 and the verifier 105 could check the current temperature for the geo-location of the terminal 140 from an outside source. This could be an additional factor in generating an authentication result.

While the above description describes the sensors being embedded in the device, it will be understood that the sensors can also be attached to the device. For example, the sensors can be electrically attached to the device.

While it is described above that the sensors can sense a biometric measurement and a characteristic of the environment, it will be understood that the sensors can sense a plurality of biometric measurements and a plurality of characteristics of the environment for strengthening authentication even further.

It will also be understood that the method described herein can be combined with other authentication techniques or methods to enable even stronger authentication.

While the invention has been disclosed in connection with preferred embodiments shown and described in detail, modifications and improvements thereon will become readily apparent to those skilled in the art. Accordingly, the spirit and scope of the present invention should be limited only by the following claims.

What is claimed is:

1. A computer-implemented method, comprising executing, on at least one processor, the steps of:
   recording an environmental profile in connection with an area, wherein the environmental profile comprises an area temperature associated with the area;
   sensing a temperature of surroundings of an authentication device;
   determining a location at which the surrounding temperature was determined for the authentication device;
   performing an analysis to assess whether the surrounding temperature of the authentication device at the said location corresponds with the area temperature as recorded within the profile;
   generating an authentication code, wherein the authentication code is generated by the authentication device based on a secret; and
   providing the authentication code for use in authentication;
   wherein the authentication code is provided by the authentication device subject to the said analysis indicating that the surrounding temperature of the authentication device at the said location corresponds with the area temperature as recorded within the profile.

\* \* \* \* \*